(12) United States Patent
Brown et al.

(10) Patent No.: US 7,731,460 B2
(45) Date of Patent: Jun. 8, 2010

(54) SELF-ADJUSTING ULD LOADING GUIDE AND RESTRAINT

(75) Inventors: James R. Brown, Jamestown, ND (US); Wallace H. Larson, Jamestown, ND (US); Justin W. Smith, Bismarck, ND (US)

(73) Assignee: Goodrich Corporation, Charlotte, NC (US)

( * ) Notice: Subject to any disclaimer, the term of this patent is extended or adjusted under 35 U.S.C. 154(b) by 543 days.

(21) Appl. No.: 11/554,363

(22) Filed: Oct. 30, 2006

(65) Prior Publication Data

US 2008/0099620 A1 May 1, 2008

(51) Int. Cl.
*B64D 9/00* (2006.01)
(52) U.S. Cl. .............................. 410/77; 410/80; 410/69; 244/118.1; 244/137.1
(58) Field of Classification Search .................... 410/77, 410/86, 69, 78, 80, 81, 84, 70, 72, 94, 95; 244/117.1, 137.1
See application file for complete search history.

(56) References Cited

U.S. PATENT DOCUMENTS

| | | | |
|---|---|---|---|
| 3,377,040 A | 4/1968 | Hansen | |
| 3,796,397 A | 3/1974 | Alberti | |
| 3,906,870 A * | 9/1975 | Alberti | 410/79 |
| 4,144,821 A | 3/1979 | Lang | |
| 4,331,412 A * | 5/1982 | Graf | 410/69 |
| 4,388,030 A | 6/1983 | Skaale | |
| 4,415,298 A | 11/1983 | Voigt | |
| 4,457,649 A | 7/1984 | Vogg et al. | |
| 4,498,823 A | 2/1985 | Trautman | |
| 4,824,050 A | 4/1989 | Courter | |
| 4,875,645 A | 10/1989 | Courter | |
| 4,993,899 A | 2/1991 | Engel et al. | |
| 5,090,638 A | 2/1992 | Eilenstein-Wiegmanns et al. | |
| 5,098,038 A | 3/1992 | Hruska et al. | |
| 5,112,173 A * | 5/1992 | Eilenstein et al. | 410/79 |
| 5,131,606 A | 7/1992 | Nordstrom | |
| 5,265,991 A | 11/1993 | Herrick et al. | |
| 5,316,242 A | 5/1994 | Eilenstein-Wiegmanns et al. | |
| 5,346,161 A | 9/1994 | Eilenstein-Wiegmanns et al. | |

(Continued)

FOREIGN PATENT DOCUMENTS

GB  2436715  3/2007

OTHER PUBLICATIONS

Combined Search and Examination Report, Application No. GB0717190. 3, Dec. 4, 2007, pp. 1-69, UK Intellectual Property Office.

*Primary Examiner*—Patricia L Engle
(74) *Attorney, Agent, or Firm*—Womble Carlyle Sandridge & Rice, PLLC

(57) ABSTRACT

A self-adjusting loading guide and restraint for guiding and restraining aircraft unit load devices includes a base and an arm substantially upwardly extending from the base. The arm includes a vertical restraint portion and guide member having at least one substantially planar guide surface that is pivotally connected to the arm, and is movable between a first guide position and a second guide position. When the vertical restraint portion is engaged with a stowed first unit load device, the guide member assists in guiding a second unit load device away from the first unit load device and the loading guide and restraint and into a stowage location that is adjacent to the first unit load device.

23 Claims, 13 Drawing Sheets

U.S. PATENT DOCUMENTS

| | | | |
|---|---|---|---|
| 5,356,250 A | 10/1994 | Vogg et al. | |
| 5,486,077 A | 1/1996 | Nutting | |
| 5,618,139 A * | 4/1997 | Graf et al. | 410/69 |
| 5,692,862 A | 12/1997 | Hilde | |
| 5,785,473 A | 7/1998 | Stark | |
| 5,816,758 A | 10/1998 | Huber | |
| 5,950,964 A | 9/1999 | Saggio et al. | |
| 5,957,406 A | 9/1999 | Nelson et al. | |
| 6,039,519 A | 3/2000 | Jones et al. | |
| 6,193,043 B1 | 2/2001 | Langston et al. | |
| 6,193,453 B1 | 2/2001 | Kernkamp | |
| 6,270,300 B1 | 8/2001 | Huber et al. | |
| 6,354,424 B1 | 3/2002 | Rowles | |
| 6,413,029 B1 | 7/2002 | Kernkamp | |
| 6,450,744 B1 | 9/2002 | Gilhuys et al. | |
| 6,485,238 B2 | 11/2002 | Segura | |
| 6,485,239 B2 | 11/2002 | Afful | |
| 6,488,457 B2 | 12/2002 | Diamante | |
| 6,729,818 B1 * | 5/2004 | Yee et al. | 410/77 |
| 6,834,758 B2 | 12/2004 | Nguyen et al. | |
| 6,871,823 B2 | 3/2005 | Roberts | |
| 2009/0016838 A1 * | 1/2009 | Roberts | 410/69 |
| 2009/0016839 A1 * | 1/2009 | Roberts | 410/69 |

* cited by examiner

SELF-ADJUSTING ULD LOADING GUIDE AND RESTRAINT

FIELD OF THE INVENTION

The invention generally relates to cargo systems, and more particularly relates to a guide and restraint device for use in guiding Unit Load Devices (hereinafter "ULDs") onto an aircraft, and at least partially restraining a ULD during transport.

BACKGROUND

The commercial shipping industry relies upon proper handling of cargo containers. Containers known as Unit Load Devices ("ULDs") commonly are used to load cargo onto aircraft. ULDs are containers and platforms of various sizes and shapes, including box-like enclosures, pallets, and the like. ULDs are sized and shaped such that they can be compactly loaded together in an aircraft cargo compartment. ULDs are loaded onto aircraft and unloaded from aircraft using various types of automatic loading equipment in order to minimize loading and unloading time. Aircraft cargo holds often are provided with ball transfer units and rollers to facilitate movement of ULDs in the cargo hold as the ULDs are loaded and unloaded. In addition, various types of restraint mechanisms are used for restraining stowed ULDs within cargo holds during transit. For example, various types of restraint devices commonly are used to inhibit lateral, longitudinal and/or vertical movement of stowed ULDs.

Longitudinal, lateral and vertical restraint devices can be installed within the cargo system trays, or can be mounted directly to an aircraft structure for use in restraining stowed ULDs during transit. Often such restraint devices are configured to be recessed below the conveyor plane (generally coinciding with the bottom surfaces of the ULDs) when not in use, and to be selectively raised for engagement with loaded ULDs once the ULDs are in their stowed positions. At the forward and aft ends of a cargo compartment, fixed end stops commonly are used to at least partially restrain the forward-most and aft-most ULDs within the cargo compartment. In addition, restraints and end stops can be installed between containers and pallets when both containers and pallets are transported together.

ULDs are designed such that they compactly fit within a plurality of rows or lanes within an aircraft's cargo hold. Normally, the lanes are arranged such that only small gaps exist between ULDs in adjacent container lanes, thereby effectively maximizing the use of the available storage volume. ULDs are loaded onto an aircraft through aircraft cargo doors, and can be loaded in a predetermined order by cargo-loading lanes. The last ULDs loaded onto an aircraft must be inserted into a final cargo-loading lane that lies between ULDs previously loaded in adjacent container lanes or between a previously loaded ULD and an end stop.

Because a cargo-loading lane can be only slightly wider than a ULD it receives, inserting a ULD into a final cargo-loading lane between previously loaded container lanes or end stops (sometimes referred to as "threading the needle") can be difficult. Misalignment between a ULD and a final cargo-loading lane as the ULD is delivered through a doorway by automated loading equipment can cause the ULD to jam, possibly resulting in substantial delays and equipment damage. Large lateral guides are known for guiding ULDs through a doorway and into a final container lane. These large lateral guides extend across the doorway and act to funnel the ULDs toward the center of the doorway and toward the center of a final container lane. Often, however, such large lateral guides are unavailable, or cannot be installed on a particular aircraft or during a particular loading event. In such cases, a standard cargo restraint is used as a lateral guide for the final cargo container lane and is relied upon to center a ULD within the loading lane. Unfortunately, ULDs can impact and hang up on such restraints, sometimes resulting in damage to the impacted restraints and/or ULDs and delaying loading of the impeded ULDs.

Accordingly, there is a need for a new lead-in device and method for facilitating the loading of ULDs into a narrow cargo container lane. In particular, there is a need for a ULD lead-in device that is substantially more compact and is quicker and easier to install and operate than known large lateral guides. Preferably, the device and method should be compatible with known ULD loading and restraint equipment. In addition, the device and method should be adaptable to the cargo-loading lane bounded by adjacent ULDs and end stops, which can vary in their positions on either side of the cargo-loading lane.

SUMMARY

The invention includes a ULD guide having a base and an arm substantially upwardly extending from the base. A guide member having at least one substantially planar guide surface can be pivotally connected to the arm. The guide member can be movable between a first guide position and a second guide position.

The invention also includes a variable lead-in guide apparatus for use in loading a cargo container into an aircraft. The apparatus can include a base configured to be secured to a structural interface of a cargo system in an aircraft, and a latch arm having a first end pivotally mounted to the base. The latch arm can further include a second end that is movable between a lowered position and a raised position. A guide member having at least one substantially planar guide surface can be pivotally connected to the latch arm, and can be movable between a first lead-in position and a second different lead-in position.

The invention further includes a ULD loading device that includes means for selectively mounting the device to a structural interface of a cargo system in an aircraft proximate to a first ULD location and to a second ULD location adjacent to the first ULD location. The device also can include means for at least partially guiding movement of a first ULD into the first ULD location and away from a second ULD positioned within the second ULD location. The means for guiding can self-adjust to different lateral spacing between the first ULD and the second ULD location.

In addition, the invention includes a cargo-loading system for aircraft. The system can include a first guide unit including a first base, a first arm substantially upwardly extending from the first base, and a first guide member having at least a first substantially planar guide surface. The first guide member can be pivotally connected to the first arm, and can be movable between a first guide position and a second guide position. The system can further include a second guide unit spaced from the first guide unit. The second guide unit can include a second base, a second arm substantially upwardly extending from the second base, and a second guide member having at least a second substantially planar guide surface. The second guide member can be pivotally connected to the second arm, and can be movable between a third guide position and a fourth guide position. The first and second guide units can be configured such that when the first guide member is positioned at or between the first and second guide positions and the second guide member is positioned at or between the third and fourth guide positions, the first and second substantially planar guide surfaces form an inwardly tapered entrance guide for at least partially guiding a first ULD into an entrance to a cargo location.

The invention also includes a method of loading ULDs onto an aircraft. The method can include loading first and second ULDs onto the aircraft such that an empty cargo space is located therebetween. The empty cargo space can have an entrance opening bounded by portions of the first and second ULDs. The method can further include at least partially restraining movement of the first and second ULDs. The method also can include providing a first inwardly angled guide member proximate to the entrance opening and proximate to the first ULD, the first angled guide member having a position at least partially fixed by contact between the first angled guide member and a portion of the first ULD. A second inwardly angled guide member can be provided proximate to the entrance opening and proximate to the second ULD, the second angled guide member having a variable position at least partially fixed by contact between the second angled guide member and a portion of the second ULD. The method also can include inserting a third ULD between the first and second angled guide members and into the empty cargo space.

These and other aspects of the invention will be understood from a reading of the following description together with the drawings.

DETAILED DESCRIPTION

Figure 1:
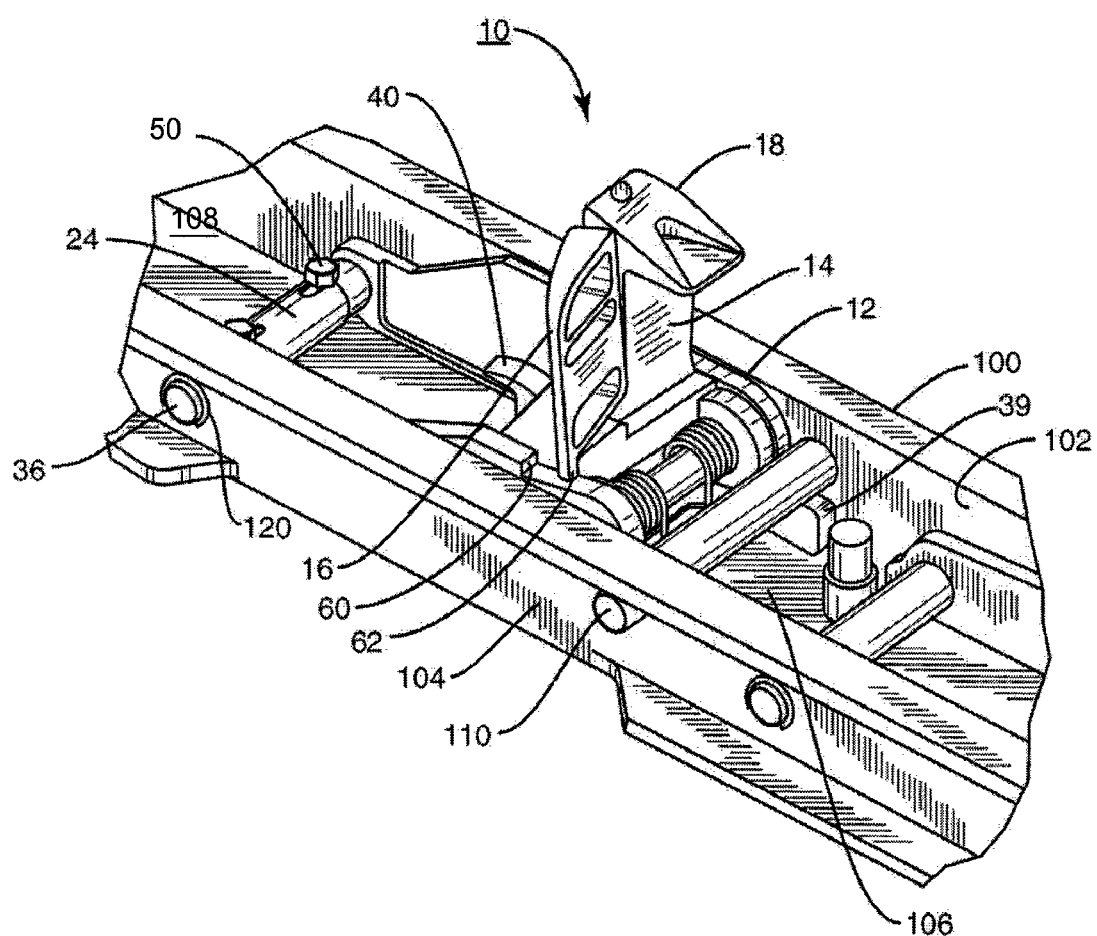
FIG. 1 is a perspective view of one embodiment of a guidance device according to the invention installed in a housing with-in the cargo system.

One embodiment of a ULD guide 10 according to the invention is shown in FIG. 1. In FIG. 1, the guide 10 is installed within a cargo system tray 100 of a type commonly used in aircraft. Such a cargo system tray 100 can include a pair of opposed sidewalls 102, 104 and a floor 106 defining a substantially U-shaped channel 108. As known to persons of ordinary skill in the art, rollers, ball transfer units (BTU's), and various devices (not shown in FIG. 1) can be mounted to or within such a cargo system tray 100 to facilitate moving ULDs across the cargo deck to their stowed positions, and to longitudinally, laterally, and vertically restrain loaded ULDs at their stowed locations. As discussed below, the installed guide 10 can be used to guide a ULD into a restricted entrance opening to a cargo-loading lane. In addition, the installed guide 10 can be used to both longitudinally and vertically restrain a loaded ULD in a stowed position.

Figure 3:
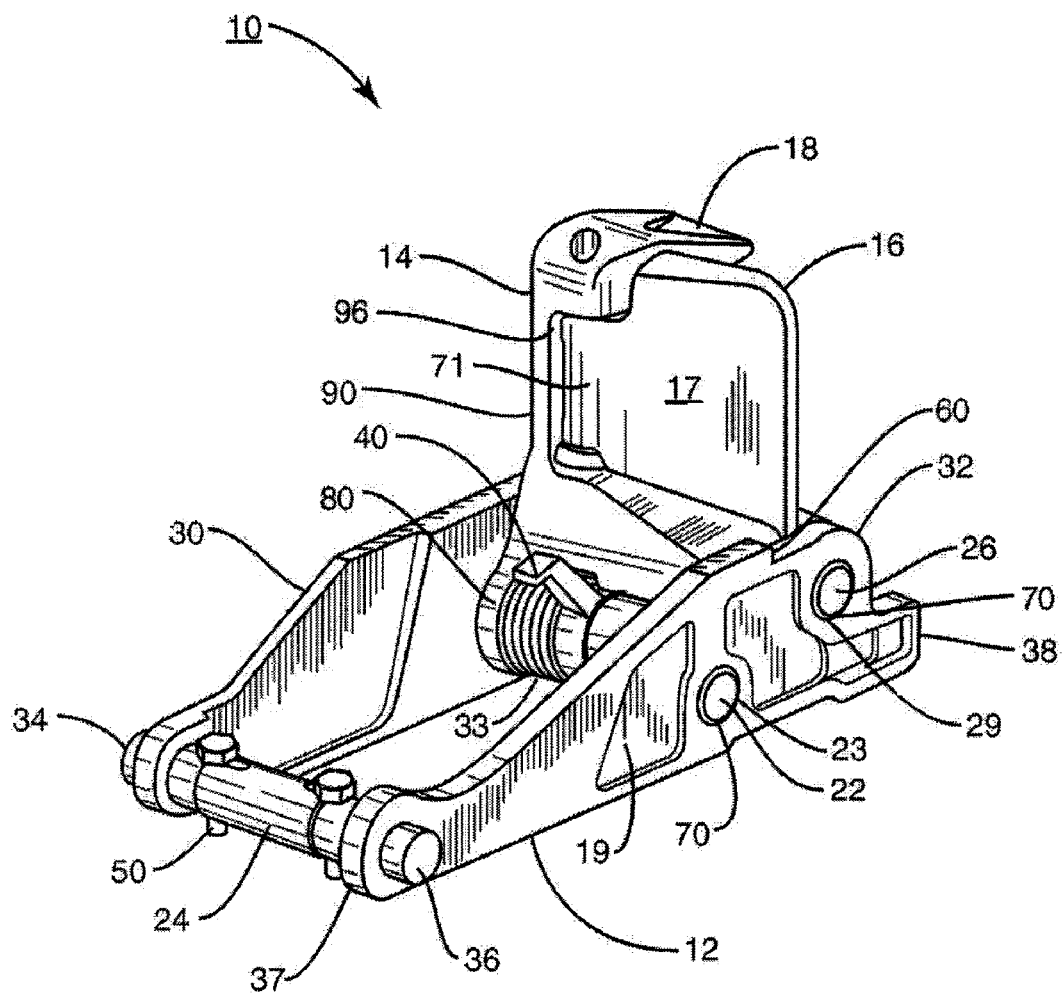
FIG. 3 is another perspective view showing the guidance device shown in FIGS. 1-2.
Figure 4:
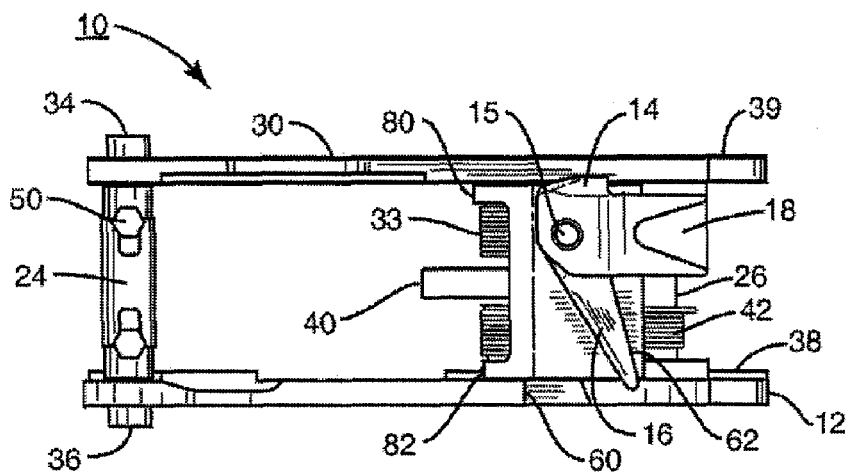
FIG. 4 is a top plan view showing the guidance device shown in FIGS. 1-3.
Figure 5:
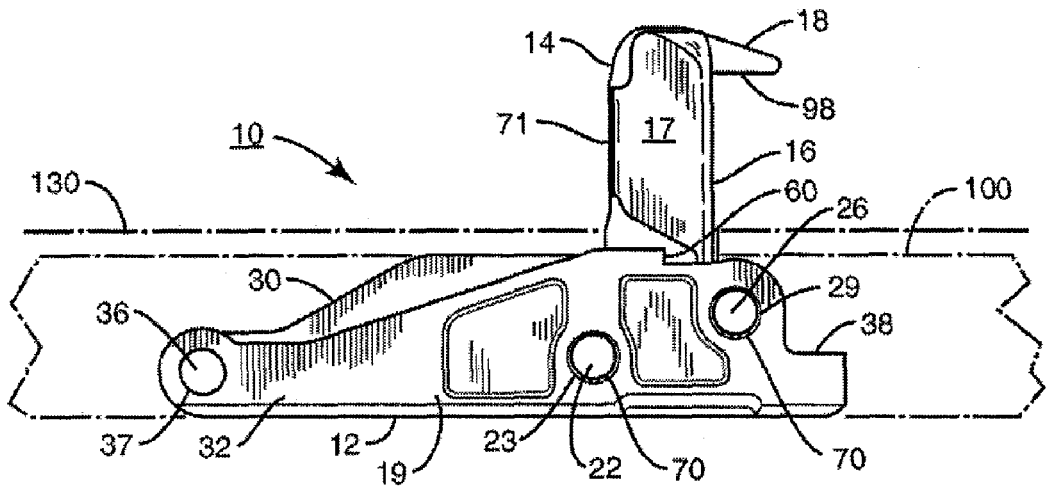
FIG. 5 is a side elevation view showing the guidance device shown in FIGS. 1-4.
Figure 6:
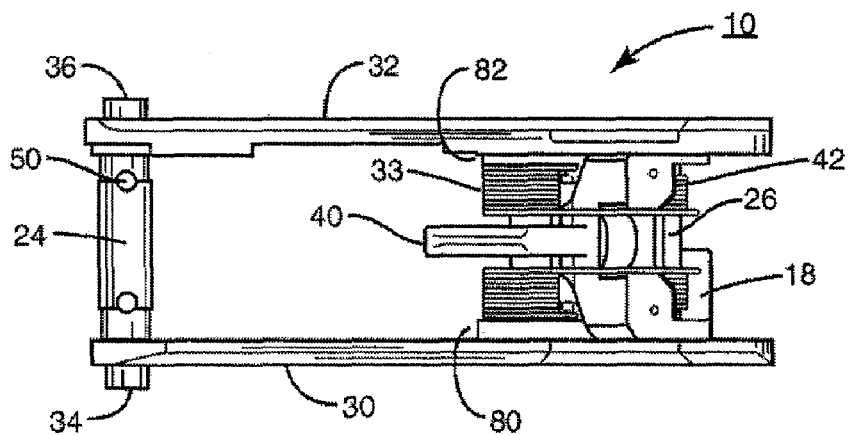
FIG. 6 is a bottom plan view showing the guidance device shown in FIGS. 1-5.

FIGS. 1-8 show the ULD guide 10 with its latch arm 14 and guide member 16 in an active raised position. As shown in FIG. 5, in this active raised position, the latch arm 14 and guide member 16 upwardly extend from the cargo system tray 100 and protrude above the associated conveyor plane 130. As discussed in detail below, in this active position, the guide 10 is operable to at least partially longitudinally and in some cases vertically restrain a ULD in a ULD location 200, and to at least partially guide another ULD into a cargo-loading lane adjacent to the ULD's location.

Figure 10:
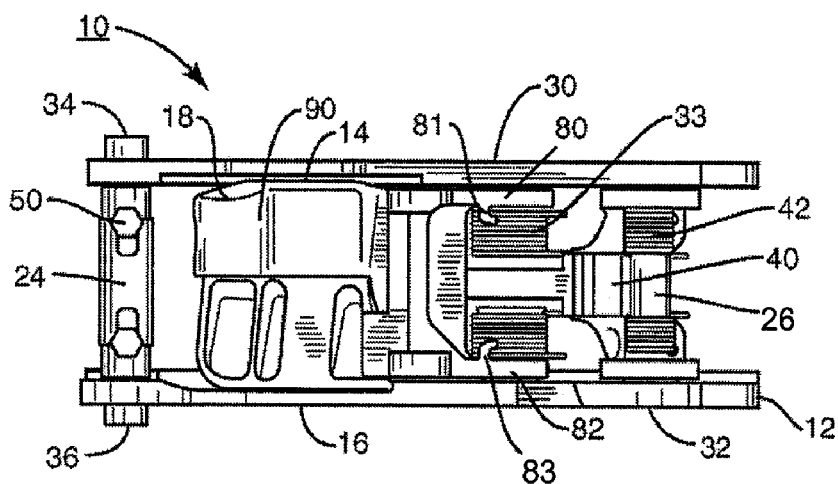
FIG. 10 is a top plan view showing the guidance device shown in FIG. 9.
Figure 11:
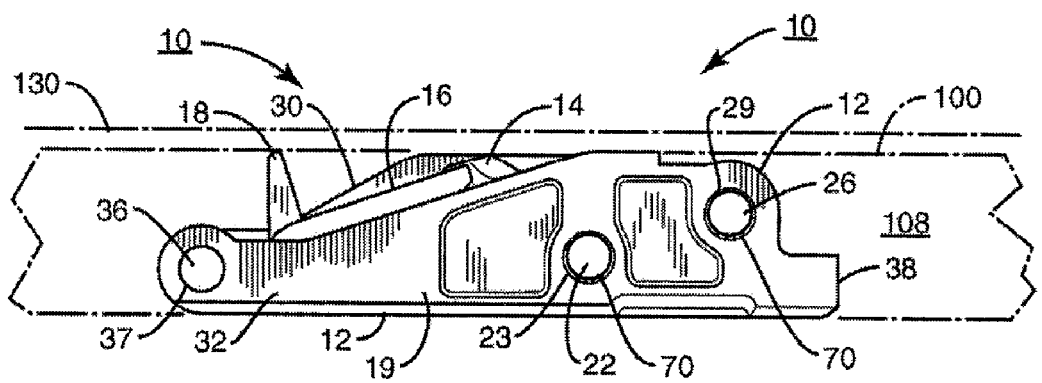
FIG. 11 is a side elevation view showing the guidance device shown in FIGS. 9-10.

In FIGS. 9-14, the guide 10 is shown with the latch arm 14 and the guide member 16 in a retracted inactive position. In this embodiment of the guide 10, the latch arm 14 and guide member 16 are selectively movable between the inactive retracted position and the raised active position. As shown in FIG. 11, when the latch arm 14 and guide member 16 are in the inactive retracted position, substantially all portions of the guide 10 are received below the conveyor plane 130 within the cargo system tray 100, and substantially no portion of the guide 10 extends above the uppermost portions of the cargo system tray 100 or the cargo plane 130. Accordingly, the guide 10 will not interfere with the movement of ULDs or other equipment and device 10 when the device is not being utilized.

Figure 2:
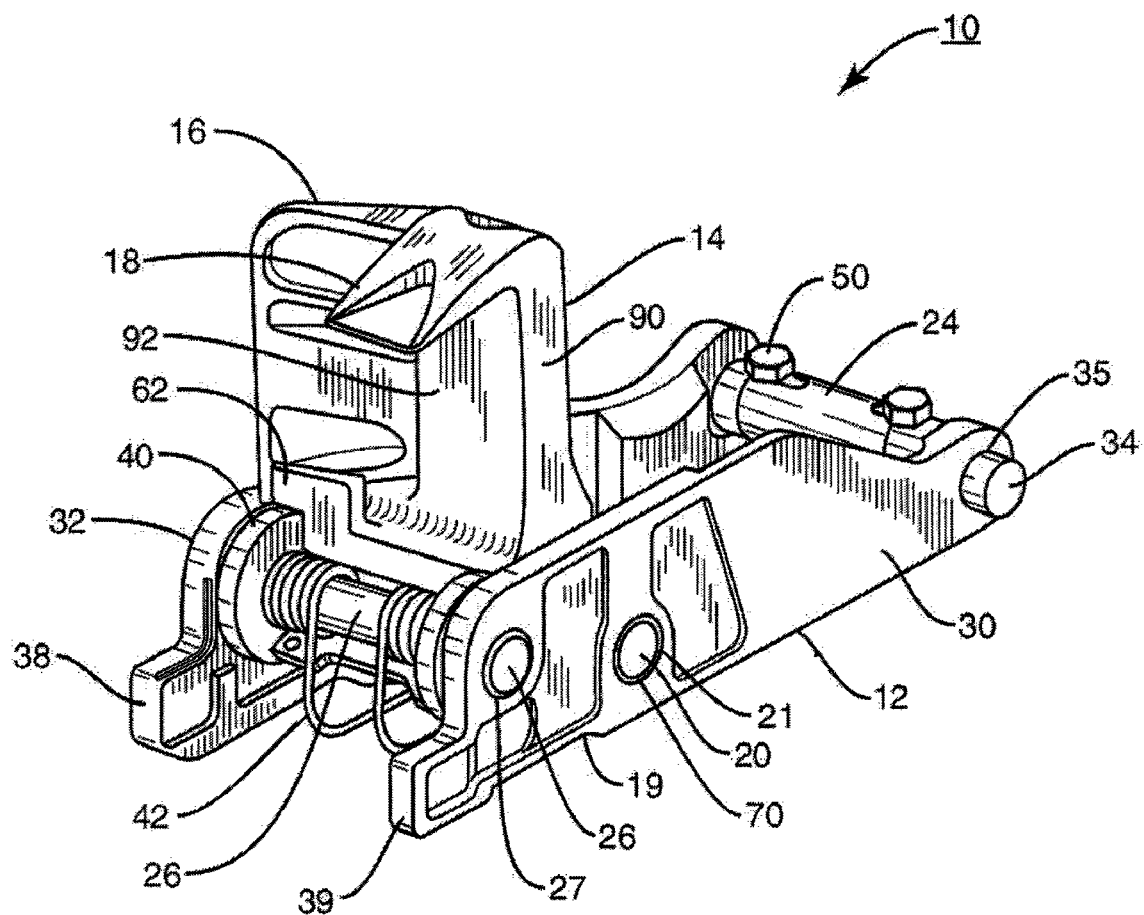
FIG. 2 is a perspective view of the guidance device shown in FIG. 1 with its latch arm and guide member in an active raised position.

The construction of one embodiment of a guide 10 according to the invention now will be described with reference to FIGS. 2-14. As shown in FIG. 2, the device 10 can include a base 12 having opposed first and second side plates 30, 32. The side plates 30, 32 can be constructed of a relatively lightweight metal such as aluminum or titanium, a lightweight composite material, or the like. Each of the side plates 30, 32 can include one or more pockets, recesses or openings 19 in order to minimize their total weight. In this embodiment of the frame 12, the side plates 30, 32 can be supported in spaced relationship by a first shaft 26 on one end and a sleeve 24 on an opposite end. As shown in FIGS. 2 and 3, opposed ends of the first shaft 26 can be received in aligned openings 27, 29 in the side plates 30, 32. The ends of the first shaft 26 can be configured to receive retainer rings 70 to retain the ends of the first shaft 26 in the openings 27, 29. The sleeve 24 can include hollow ends that slidably receive anchor pins 34, 36. The anchor pins 34, 36 can outwardly extend from respective ends of the sleeve 24 and from the base 12 through aligned openings 35, 37 in the side plates 30, 32. In one embodiment, the anchor pins 34, 36 can be fixed in their outwardly extending positions by screws 50 that extend through aligned transverse openings in the sleeve 24 and the anchor pins 34, 36. As shown in FIG. 1, the opposed side plates 30, 32 can be spaced apart such that the side plates 30, 32 are proximate to the inside surfaces of the upright walls 102, 104 of a roller tray 100 when the guidance/retainer device 10 is inserted into the tray's channel 108.

As shown in FIG. 2, each of the side plates 30, 32 can include a toe portion 38, 39 on an end opposite from the anchor pins 34, 36. Returning to FIG. 1, the toe portions 38, 39 (only one shown in FIG. 1) can be sized to be received and securely retained beneath a transverse pin 110 extending between the upright walls 102, 104 of the cargo system tray 100. When the toe portions 38, 39 are received beneath the transverse pin 110, the anchor pins 34, 36 (only one shown in FIG. 1) can be outwardly extended from the base 12 such that they engage aligned openings 120 in the upright walls 102, 104 of the cargo system tray 100 (only one shown in FIG. 1). In this arrangement, the engaged toe portions 38, 39 and anchor pins 34, 36 combine to securely retain the base 12 and guide 10 within the cargo system tray 100.

Figure 12:
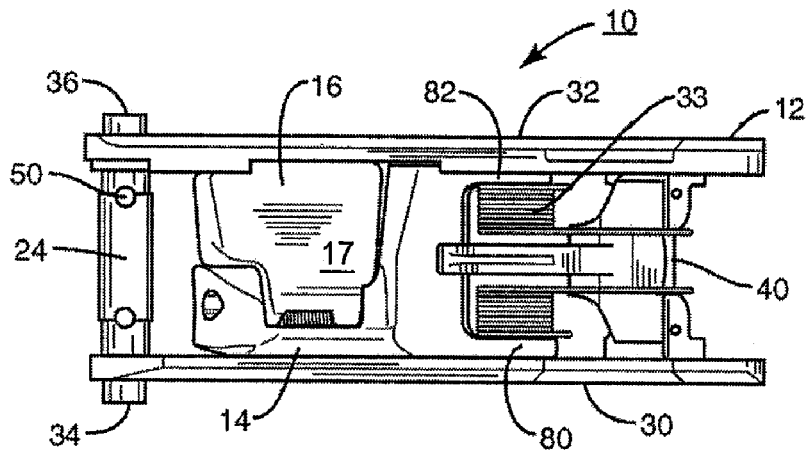
FIG. 12 is a bottom plan view showing the guidance device shown in FIGS. 10-11.
Figure 13:
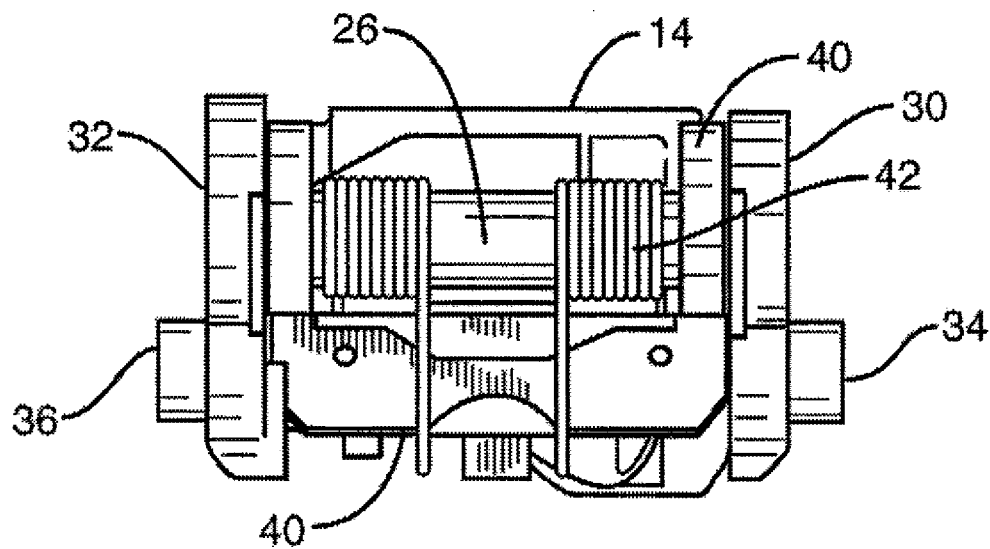
FIG. 13 is an end elevation view showing a first end of the guidance device shown in FIGS. 10-12.
Figure 14:
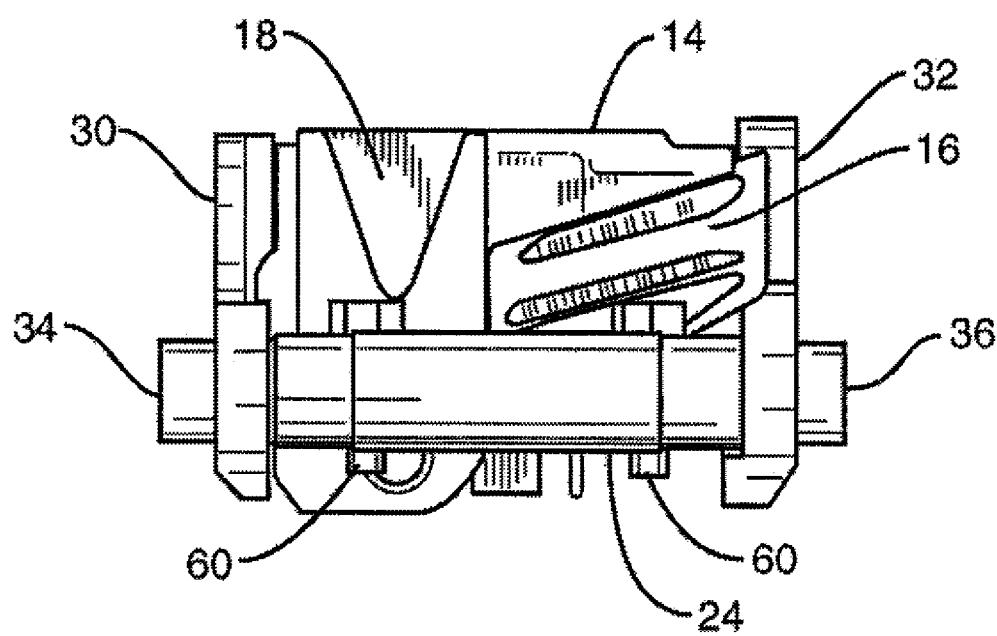
FIG. 14 is an end elevation view showing the opposite end of the guidance device shown in FIG. 13.

As shown in FIGS. 1-14, this embodiment of the guide 10 can include a latch arm 14. As best seen in FIGS. 3, 4, 6, 7, 10 and 12, the latch arm 14 can include a pair of spaced lugs 80, 82. As best seen in FIGS. 2, 5, 9 and 11, the spaced lugs 80, 82 can be respectively pivotally mounted on pivot pins 20, 22 that respectively engage aligned openings 21, 23 in the opposed side plates 30, 32. The pivot pins 20, 22 can be configured to be retained in the openings 21, 23 in the side plates 30, 32 by retaining rings 70 or the like. The pivot pins 20, 22 permit the latch arm 14 to rotate between the raised active position shown in FIGS. 1-8, and the retracted inactive position shown in FIGS. 9-14. Alternatively, the latch arm 14 can be non-movably attached to the base such that the latch arm is fixed in an upright, active position (not shown in the FIGS.). As shown in FIGS. 10 and 12, the guide 10 can include one or more biasing members 33, such as metal coil springs or the like, for biasing the pivoting movement of the latch arm 14 relative to the base 12. In one embodiment, the biasing members 33 are arranged to urge the latch arm toward the retracted inactive position shown in FIG. 11. In an alternative embodiment, the biasing members 33 can be arranged to urge the latch arm 14 toward the raised active position shown in FIG. 5.

As best seen in FIGS. 3, 4, 6 and 7, the guide 10 can include a moveable latch 40 for selectively restraining the latch arm 14 in the raised active position. As best seen in FIGS. 10-13, the latch 40 can be pivotally mounted on the first shaft 26. One or more springs 42 also can be mounted on the first shaft 26 for biasing the latch 40 toward the locking position shown in FIGS. 3, 4, 6 and 7. The latch 40 is configured such that in the locking position, a portion of the latch 40 presses against a portion of the latch arm 14, and blocks downward rotation of the latch arm 14 from the raised active position. In order to lower the latch arm 14 from the raised active position to the retracted inactive position, the latch 40 can be manually rotated about the first shaft such that the latch 40 no longer blocks movement of the latch arm 14.

As shown in FIGS. 2 and 3, the latch arm 14 can include an elongated body portion 90 having an outboard face 92 and an opposed inboard face 96. As shown in FIGS. 2 and 5, a free end of the body portion 90 can include a vertical restraint portion 18 that outwardly extends from the outboard face 92. As will be further described below, the vertical restraint portion 18 can be configured to selectively engage and vertically restrain a lower portion of an adjacent ULD. As shown in FIG. 5, the vertical restraint portion 18 can include a lower surface 98 that is substantially planar and substantially horizontal when the latch arm 14 is in the raised active position. As shown in FIG. 11, the vertical restraint portion 18 can be configured such that substantially no part of the vertical restraint portion 18 extends above an associated cargo system tray 100 when the latch arm 14 is in the retracted inactive position.

Figure 7:
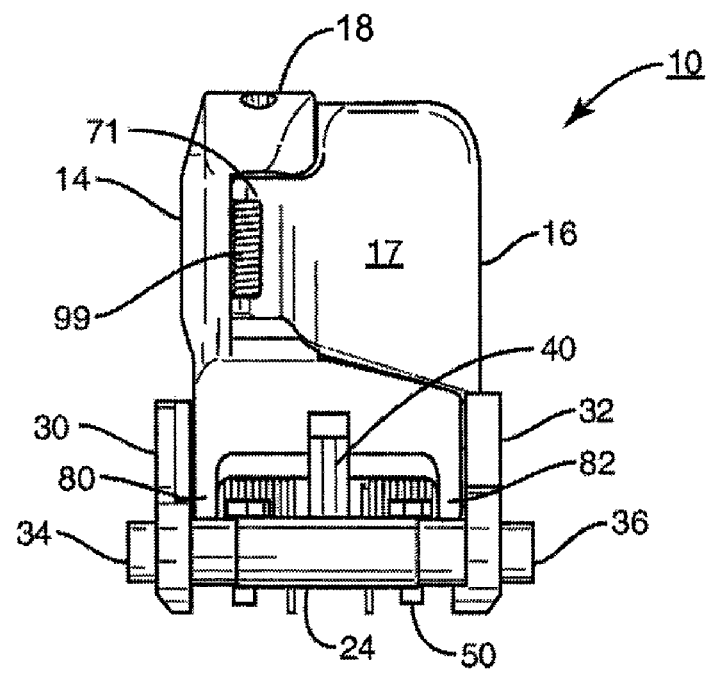
FIG. 7 is an end elevation view showing a first end of the guidance device shown in FIGS. 1-6.
Figure 8:
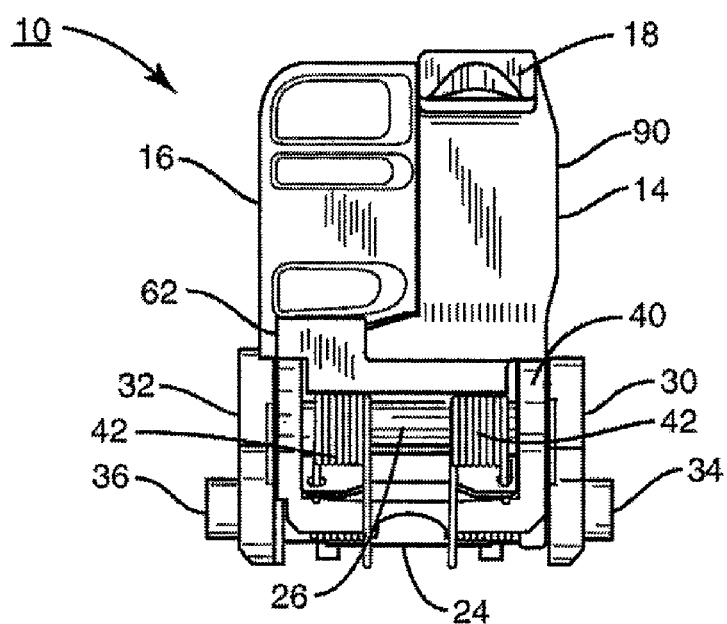
FIG. 8 is an end elevation view showing the opposite end of the guidance device shown in FIG. 7.
Figure 9:
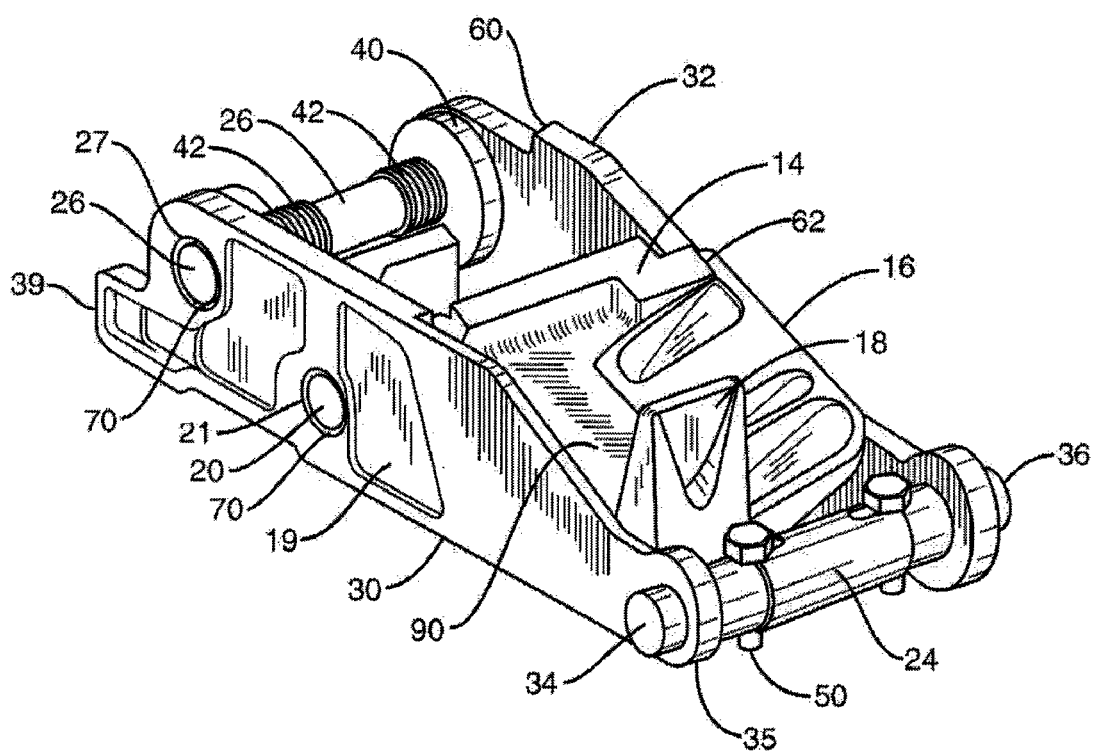
FIG. 9 is a perspective of the guidance device shown in FIGS. 1-8 with the latch arm and guide member in an inactive retracted position.

As shown in FIGS. 1-5, 7-12 and 14, the guide 10 can further include a guide member 16 pivotally attached to the elongated body 90 of the latch arm 14. As best seen in FIGS. 3, 4 and 7, the guide member 16 can include a hinge portion 71 received in a recess in the elongated body 90 of the latch arm 14. As shown in FIG. 4, a hinge pin 15 downwardly extends through the hinge portion 71 and the body 90, thereby permitting rotation of the guide member 16 about the hinge pin 15. As shown in FIGS. 2 and 4, the latch arm can include a first stop 62 that limits rotation of the guide member 16 in a first direction. As shown in FIGS. 3-5, the side plate 32 of the base 12 can include a second stop 60 that limits rotation of the guide member 16 in a second opposite direction. The first and second stops 60, 62 can be arranged to provide a desired range of movement of the guide member between the two stops 60, 62. As shown in FIG. 7, a hinge spring 99 can be provided to urge the guide member toward either the first stop 62 or the second stop 60. In the embodiment shown in FIGS. 2 and 4, the hinge spring 99 is configured to urge rotation of the guide member toward and against the first stop 62. The desirability of biasing the guide member 16 toward the first stop 62 is discussed below.

Figure 15:
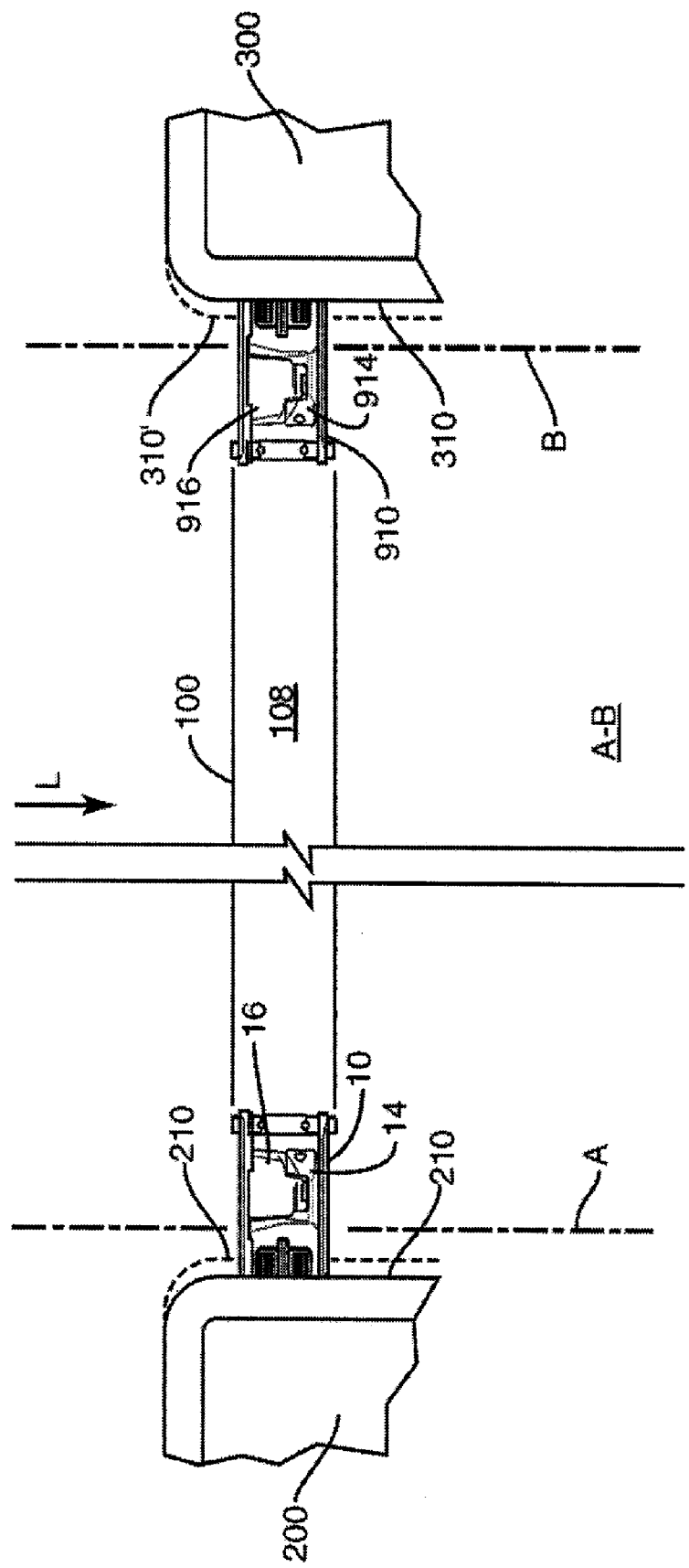
FIG. 15 is a top plan view showing two guidance devices according to the invention assembled to a cargo hold of a cargo system proximate to either side of an entrance to a cargo-loading lane.

Operation of a guide 10 is described with reference to FIGS. 15-17. In FIG. 15, a first guide 10 is installed in a cargo system tray 100 proximate to an entrance and a left boundary "A" of a ULD lane "A-B". Also shown in FIG. 15 is a second guide 910 installed in the cargo system tray 100 proximate to the entrance and a right boundary "B" of the cargo container lane "A-B". The second guide 910 is substantially identical to the first guide 10 described above, but is a mirror image thereof. For example, the guides 10, 910 can be secured in the cargo system tray 100 in the manner shown in FIG. 1 and described above. The direction of loading is shown by arrow "L." In FIG. 15, the latch arms 14, 914 and guide members 16, 916 of the guides 10, 910 are in their retracted inactive positions such that the guides 10, 910 will not interfere with the movement of cargo containers being loaded proximate to the retracted guides 10, 910.

As shown in FIG. 15, a ULD 200 has been positioned in a cargo-loading lane adjacent to boundary A. The ULD 200 includes a restraint lip 210 around its circumference proximate to its bottom of a type well known in the art. Another ULD 300 can be positioned in an adjacent cargo-loading lane to the right of lane boundary B. The ULD 300 includes a restraint lip 310 around its circumference proximate to its bottom. As indicated in FIG. 15 by dashed lines 210' and 310', the proximity of the ULDs 200, 300 to the lane boundaries A and B can vary due to clearances between the outer edges of the ULD restraint lips 210, 310 and the various conventional restraint devices (not shown in FIG. 15) used to locate and secure the two cargo containers 200, 300 at various install points around the circumferences of the containers 200, 300.

Figure 16A:
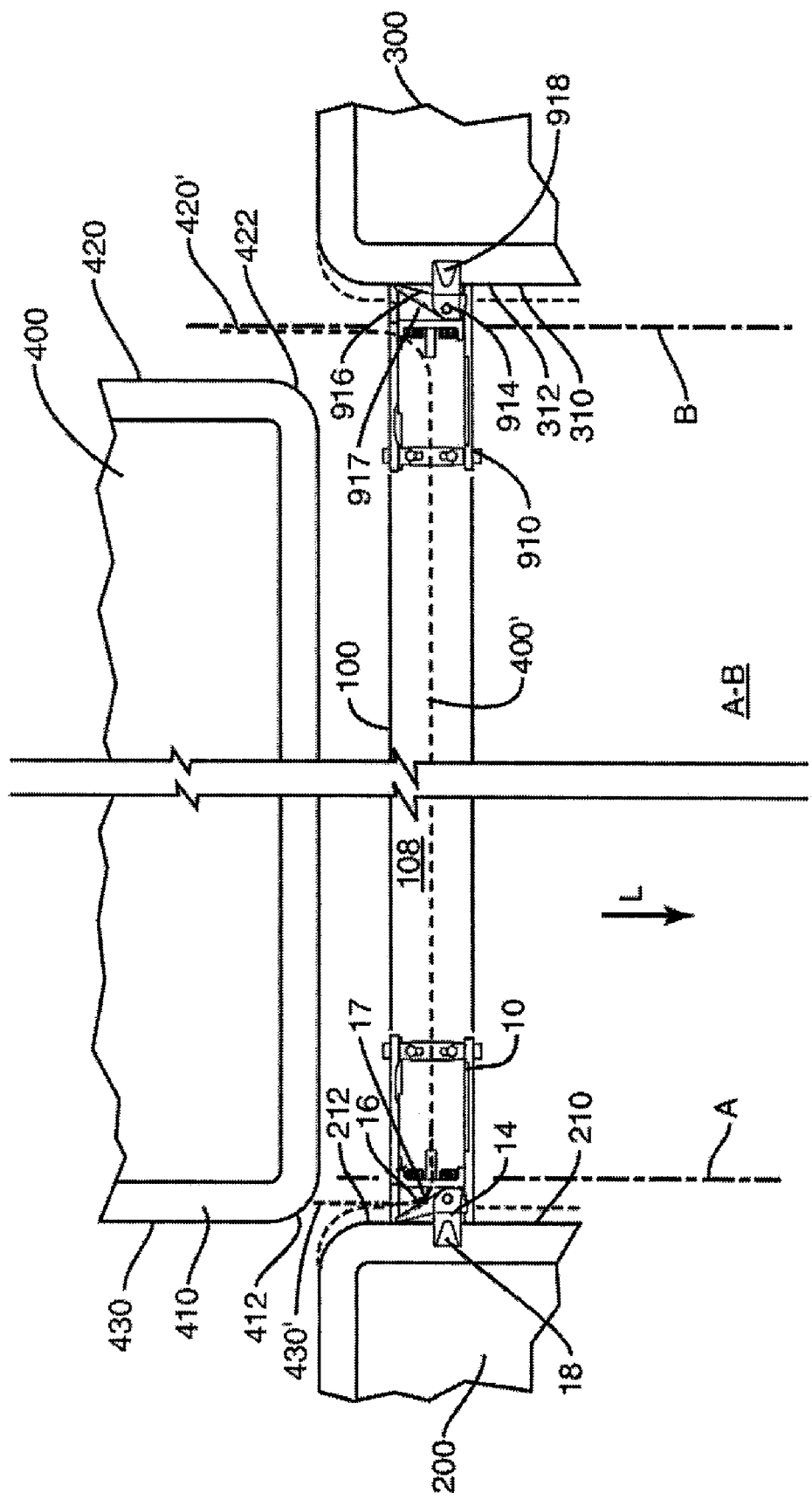
FIG. 16A is a schematic top plan view showing use of the guidance restraint devices of FIG. 15 to restrain two ULDs on either side of an entrance to a cargo-loading lane and to guide a misaligned third ULD into the cargo-loading lane.

As shown in FIG. 16A, once the ULD 200 is in its stowed position, the latch arm 14 of the first guide 10 can be manually or otherwise raised to its active position such that vertical restraint portion 18 can engage and overlap ULD restraint lip 210 when required by the cargo-loading configuration. Similarly, once the second ULD 300 is in its stowed position, the latch arm 914 of guidance device 910 can be raised to its active position. When so engaged, the vertical restraint portions 18, 918 can restrict upward vertical movement of the engaged portions of ULD restraint lips 210, 310, and thus at least partially restrict vertical upward movement of the ULD 200, 300.

As further shown in FIG. 16A, when the latch arms 14, 914 are raised to their active positions, the free edges of guide members 16 and 916 respectively contact adjacent edges of the ULD restraint lips 210, 310. Note that the raised guide members 16, 916 combine to form a tapered, inwardly angled lead-in proximate to the entrance to cargo-loading lane A-B between adjacent stowed containers 200 and 300.

In FIG. 16A, ULD 400 is shown being loaded into cargo-loading lane A-B, such as with conventional automated ULD loading equipment. ULD 400 includes a restraint lip 410 having a left edge 430. Note that in FIG. 16A, container 400 is initially misaligned with cargo-loading lane A-B such that left edge 430 is shown to the left of lane boundary A. As indicated by dashed lines 400' and 430', as leading portions of the misaligned ULD 400, begin to enter cargo-loading lane A-B, corner 412 of restraint lip 410 contacts guide member 16 of first guide 10. As the ULD 400 continues its travel in cargo-loading lane A-B, the inwardly sloped guide surface 17 of guide member 16 guides the ULD 400 to the right, thereby forcing the leading portions of ULD 400 toward lane A-B. Once container corner 412 and leading portions of container 400 have been fully inserted past guide member 16, the ULD 400 is fully aligned with its cargo-loading lane A-B, and can be fully inserted to its stowed position.

Figure 16B:
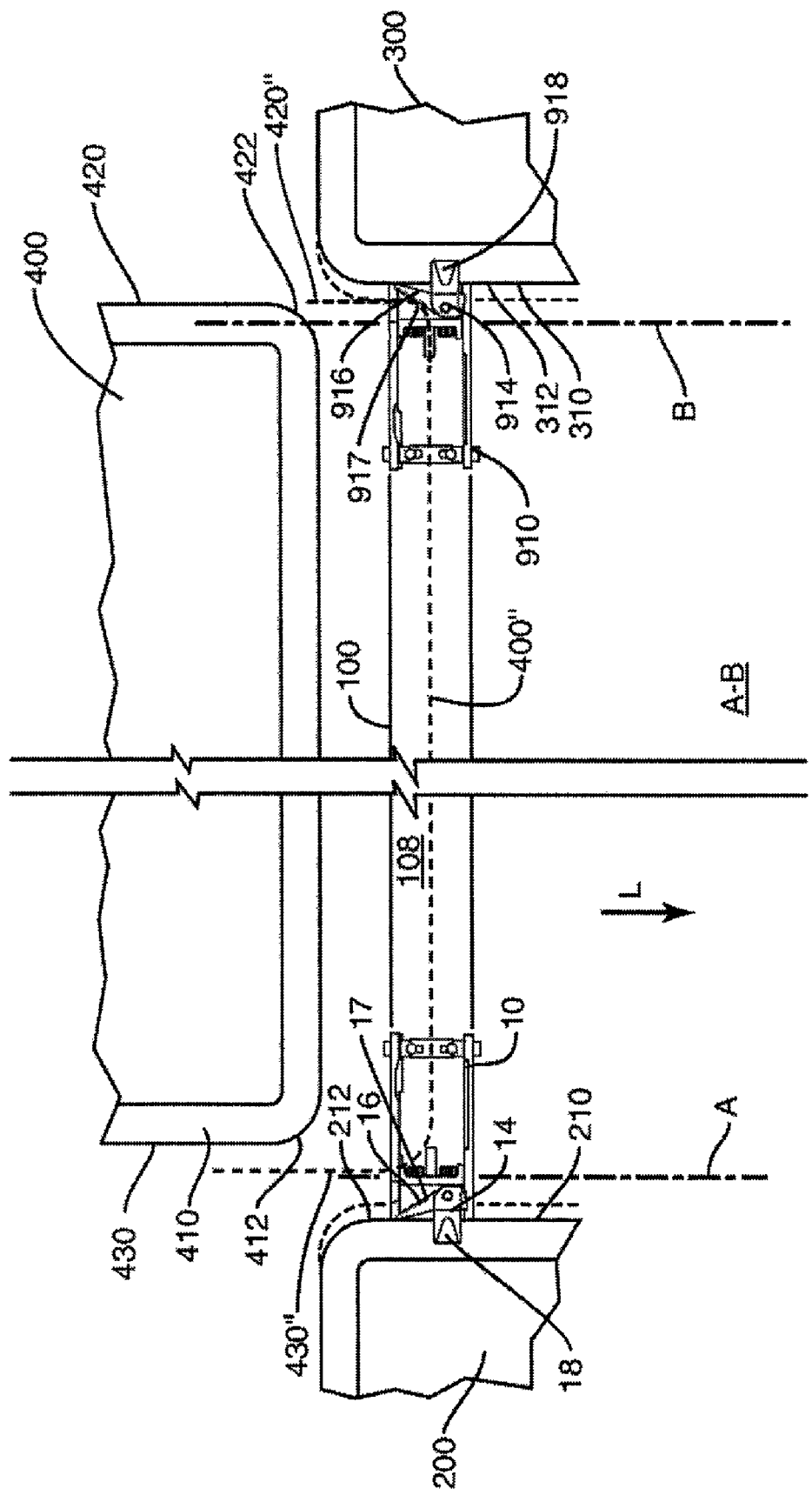
FIG. 16B is a schematic top plan view showing use of the guidance restraint devices of FIG. 15 to restrain two ULDs on either side of an entrance to a cargo-loading lane, and to guide a misaligned third ULD into the cargo-loading lane.

Similarly as shown in FIG. 16B, ULD 400 may be initially misaligned with cargo-loading lane A-B such that right edge 420 is to the right of lane boundary B. As indicated by dashed lines 400" and 420", as leading portions of the misaligned ULD 400 begins to enter cargo-loading lane A-B, corner 422 of restraint lip 410 contacts guide member 916 of the second guidance device 910. As the ULD 400 continues its travel toward cargo-loading lane A-B, the inwardly sloped guide surface 917 of guide member 916 guides the ULD 400 to the left, thereby forcing the leading portions of container 400 toward cargo-loading lane A-B. Once ULD corner 422 and leading portions of ULD 400 have been inserted past guide member 916, the ULD 400 is fully aligned with its cargo-loading lane, and can be fully inserted into cargo-loading lane A-B to its stowed position.

Figure 17:
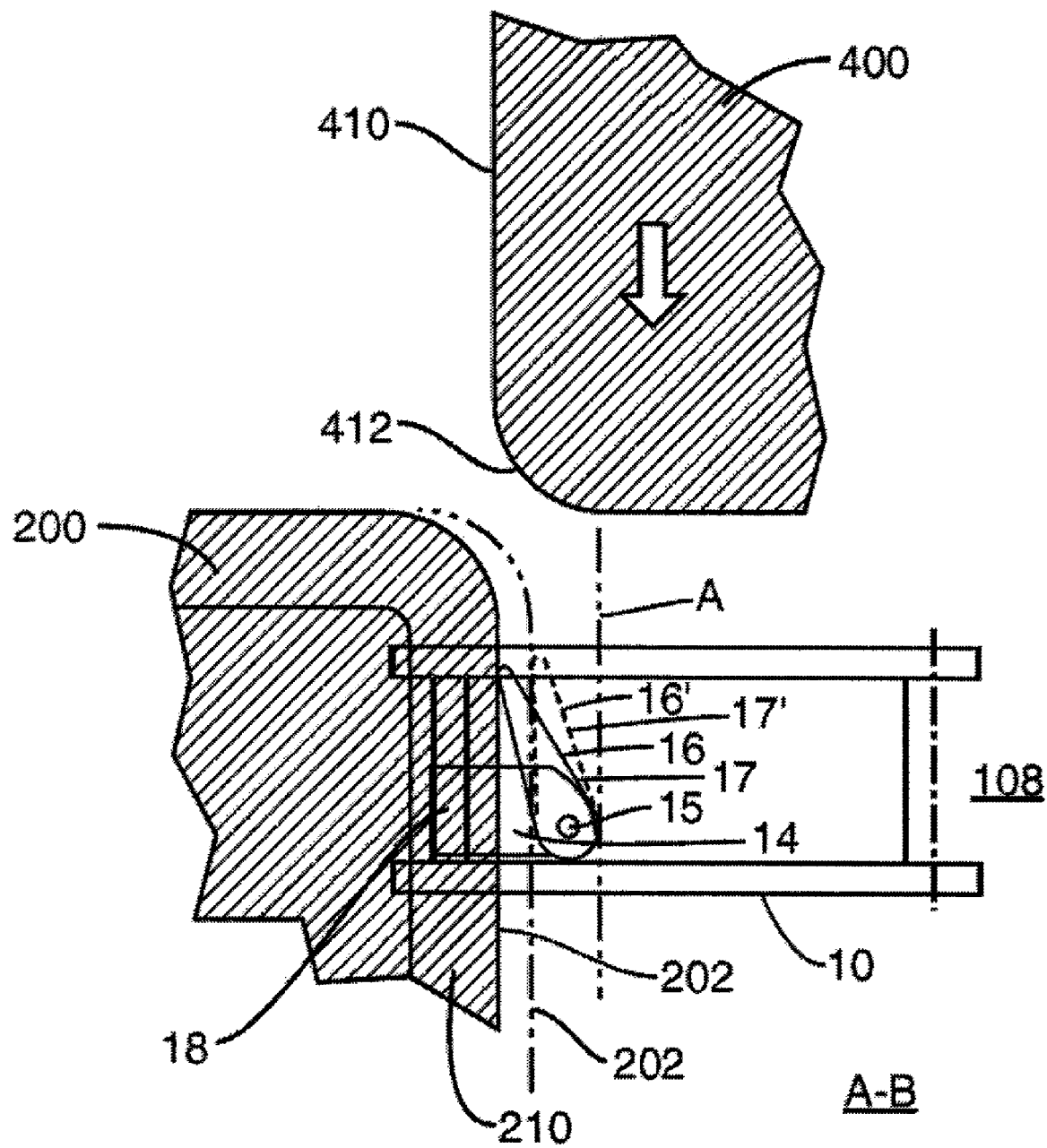
FIG. 17 is a schematic diagram showing self-adjusting operation of a guidance device according to the invention to provide a variable lead-in guide surface for at least partially guiding a ULD into a restricted entrance to a cargo-loading lane.

FIG. 17 shows an exploded corner portion of a previously loaded and parked ULD 200, and a corner portion 412 of the ULD 400 being loaded into cargo-loading lane A-B. As discussed above, due to clearances between the adjacent ULD 200 and the longitudinal restraints used to restrain the adjacent ULD 200 in its parked position, the right edge 202 of the restraint lip 210 of the ULD 200 can be located anywhere from a leftmost position (indicated by solid line 202 in FIG. 17) to a rightmost position (indicated by broken line 202' in FIG. 17). As indicated by reference numerals 16' and 17', when latch arm 14 of guide 10 is raised to its active position, contact between the guide member 16 and the ULD edge 202 causes the guide member 16 to automatically pivot about hinge pin 15. Accordingly, the guide member 16 self-adjusts such that guide surface 17 always extends between the nearest edge of the adjacent ULD 200 and the cargo-loading lane boundary A. Such self-adjustment minimizes the chance that the ULD 400 will catch on the guide 10 as the ULD 400 is loaded, and that a continuous guide surface 17 is available between the adjacent ULD 200 and the cargo-loading lane boundary A for guiding a misaligned ULD 400 into cargo-loading lane A-B.

Figure 18:
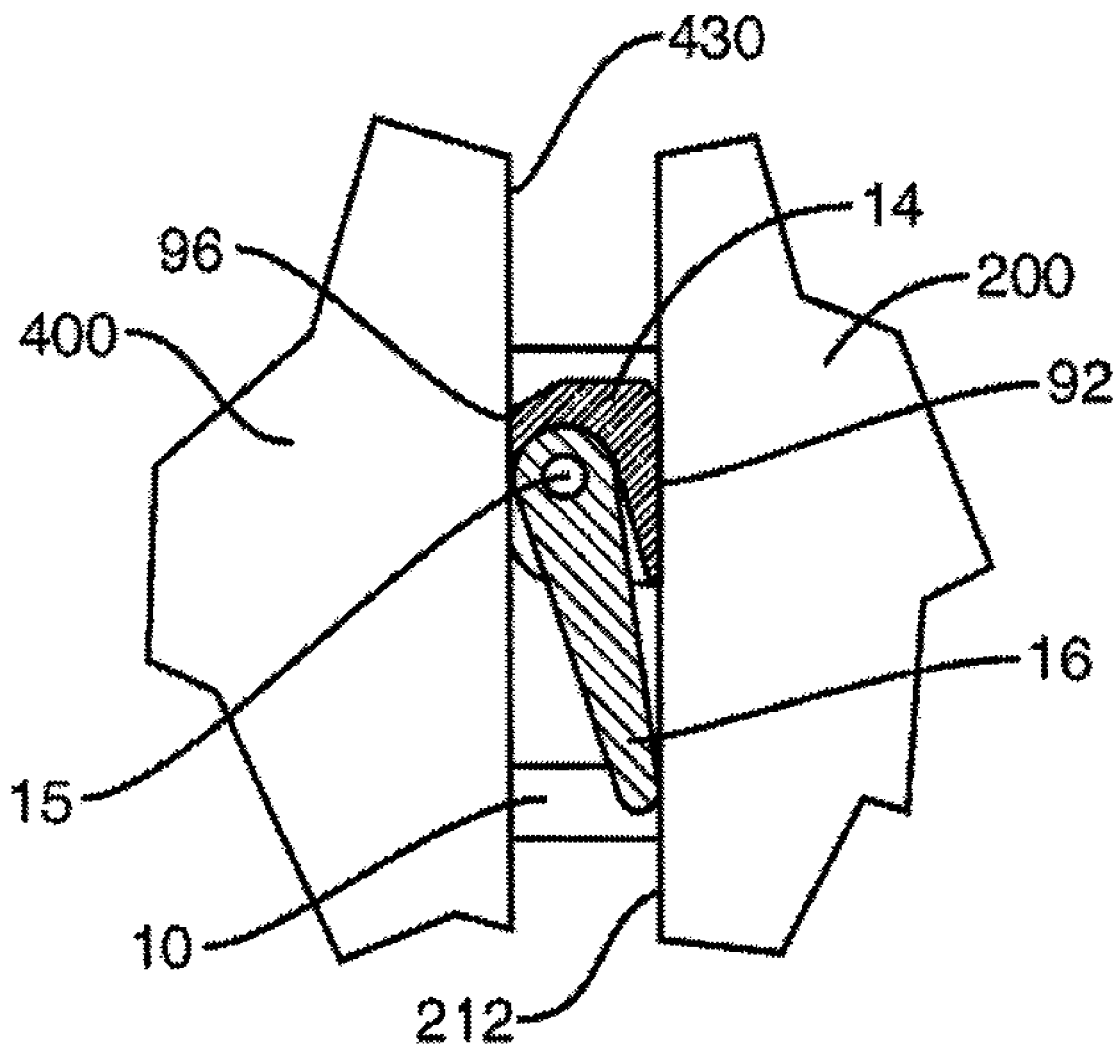
FIG. 18 is a schematic top plan view showing the guidance device according to the invention longitudinal restraining adjacent ULDs.

As shown in FIG. 18, a guide 10 according to the invention can also function as a longitudinal restraint. After ULD 400 is stowed adjacent to ULD 200, latch arm 14 is positioned between respective edges 212, 430 of the ULDs 200, 400. Outboard surface 92 of latch arm 14 at least partially limits movement of ULD 200 toward ULD 400. Similarly, inboard surface 96 at least partially limits movement of ULD 400 toward ULD 200.

The above descriptions of various embodiments are intended to illustrate particular aspects and features of the invention. Persons of ordinary skill in the art will recognize that certain modifications can be made to the described embodiments without departing from the invention. For example, the vertical restraint portion 18 of latch arm 14 of one embodiment of a guide 10 described above could be omitted such that the device 10 provides lead-in guidance and longitudinal restraint for ULDs, but provides no substantial vertical restraint. The system could use the guide on one side only, and use an end stop or conventional restraint on the other side for a cargo system that loads in a single direction from the cargo door. Still further, though a guide according to the invention is principally described as being configured for installation within a cargo system tray, a guide according to the invention also can be configured for attachment to other portions of an aircraft cargo system. For example, the retractable latch arm 15 can be mounted directly to a portion of the aircraft structure, thereby eliminating the need for side plates 30 and 32. In addition, a device according to the invention can be configured to provide longitudinal guidance and lateral and vertical restraint, rather than lateral guidance and longitudinal and vertical restraint like that described above. These and other such modifications are intended to be within the scope of the appended claims.

What is claimed is:

1. A unit load device (ULD) guide comprising:
   (a) a base;
   (b) an arm substantially upwardly extending from the base and including a vertical restraint portion outwardly extending from the arm; and
   (c) a guide member having at least one substantially planar guide surface, the guide member being pivotally connected to the arm and separate from the vertical restraint portion and being movable between a first guide position and a second guide position;
   (d) wherein the substantially planar guide surface extends between a first elevation proximate to the vertical restraint portion and a second elevation proximate to the base.

2. The ULD guide according to claim 1 and further comprising at least one biasing member configured to urge the guide member toward the first guide position.

3. The ULD guide according to claim 1 wherein the base is configured for selective engagement in a guide mounting structure.

4. The ULD guide according to claim 3 wherein the base comprises at least one anchor pin or fastener operable to selectively engage an opening in the guide mounting structure.

5. The ULD guide according to claim 1 wherein the arm is pivotally connected to the base and is movable between an active position and an inactive position.

6. The ULD guide according to claim 5 wherein the arm and guide member substantially upwardly extend from the base in the active position, and the arm and guide member are substantially recessed within the base in the inactive position.

7. The ULD guide according to claim 5 and further comprising at least one biasing member configured to urge the arm toward the inactive position.

8. The ULD guide according to claim 5 and further comprising a latch operable to selectively retain the arm in the active position.

9. The ULD guide according to claim 1 wherein the guide member is configured such that at least a portion of the guide member is capable of contacting a portion of an adjacent cargo container located at a first proximity to the ULD guide, and in the second guide position, at least a portion of the guide member is capable of contacting a portion of an adjacent ULD located at a second proximity to the ULD guide that is different from the first proximity.

10. The ULD guide according to claim 1 and further comprising at least one stop configured to at least partially limit movement of the guide member.

11. A variable lead-in guide apparatus for use in loading a cargo container into an aircraft, the apparatus comprising:
(a) a base configured to be secured to a structural interface of a cargo system in the aircraft;
(b) a latch arm having a first end pivotally mounted to the base, and a second end being movable between a lowered position and a raised position and including a vertical restraint portion outwardly extending from the second end; and
(c) a guide member having at least one substantially planar guide surface, the guide member being separate from the vertical restraint portion, pivotally connected to the latch arm and movable between a first lead-in position and a second lead-in position different from the first lead-in position;
(d) wherein the substantially planar guide surface extends between a first elevation proximate to the vertical restraint portion and a second elevation proximate to the base.

12. The variable lead-in guide apparatus according to claim 11 wherein the vertical restraint portion is configured to engage at least a portion of a first cargo container in a first ULD location, and the guide member is configured to at least partially guide movement of a second cargo container into a second ULD location that is adjacent to the first ULD location.

13. The variable lead-in guide apparatus according to claim 11 and further comprising at least one biasing member operable to urge the latch arm toward the lowered position.

14. The variable lead-in guide apparatus according to claim 11 and further comprising at least one biasing member operable to urge the guide member toward the first lead-in position.

15. The variable lead-in guide apparatus according to claim 11 and further comprising a latch for selectively retaining the latch arm in the raised position.

16. The variable lead-in guide apparatus according to claim 11 and further comprising at least one stop configured to at least partially limit movement of the guide member.

17. The variable lead-in guide apparatus according to claim 11 wherein the substantially planar guide surface is operable to at least partially guide movement of a second cargo container away from a first cargo container as the second cargo container is being loaded into a ULD location that is adjacent to the first cargo container.

18. A unit load device (ULD) loading apparatus comprising:
(a) means for selectively mounting the device to a structural interface of an aircraft cargo system proximate to a first ULD location and proximate to a second ULD location that is adjacent to the first ULD location;
(b) means for at least partially guiding movement of a first ULD into the first ULD location and away from a second ULD positioned within the second ULD location, wherein the means for guiding self-adjusts to different horizontal spacings between the first ULD and the second ULD location; and
(c) means for restraining vertical movement of the second ULD when the second ULD is in the second ULD location, the means for restraining vertical movement of the second ULD being separate from the means for at least partially guiding movement of the first ULD;
(d) wherein the means for at least partially guiding movement of a first ULD extends between the means for restraining vertical movement and the means for selectively mounting the device to a structural interface of an aircraft cargo system.

19. The ULD loading apparatus according to claim 18 wherein the means for guiding comprises a pivoting guide member having at least one substantially planar guide surface configured to at least partially direct the first ULD away from the second ULD as the first ULD is inserted into the first ULD location.

20. The ULD loading apparatus according to claim 19 wherein the guide member is pivotally connected to a retractable arm.

21. The ULD loading apparatus according to claim 18 wherein the means for mounting includes a base configured to be selectively received and secured in a structural interface of a cargo system in an aircraft.

22. A cargo-loading system comprising:
(a) a first guide unit comprising a first base, a first arm substantially upwardly extending from the first base, a first vertical restraint portion that outwardly extends from the first arm, and a first guide member having at least a first substantially planar guide surface and being separate from the first vertical restraint portion, the first guide member being pivotally connected to the first arm and being movable between a first guide position and a second guide position;
(b) a second guide unit spaced from the first guide unit and comprising a second base, a second arm substantially upwardly extending from the second base, a second vertical restraint portion that outwardly extends from the second arm, and a second guide member having at least a second substantially planar guide surface and being separate from the second vertical restraint portion, the second guide member being pivotally connected to the second arm and being movable between a third guide position and a fourth guide position;
(c) wherein the first and second guide units are configured such that when the first guide member is positioned at or between the first and second guide positions and the second guide member is positioned at or between the third and fourth guide positions, the first and second substantially planar guide surfaces form an inwardly tapered entrance guide for at least partially guiding a first ULD into an entrance to a cargo location;

(d) wherein the first substantially planar guide surface extends between a first elevation proximate to a first upper end of the first arm and a second elevation proximate to the first base; and (e) wherein the second substantially planar guide surface extends between an upper elevation proximate to a second upper end of the second arm and a lower elevation proximate to the second base.

23. The cargo-loading system according to claim 22 wherein the entrance is between a second cargo container and a third cargo container, and wherein the first and second guide units are configured such that at least a portion of the first guide member contacts at least a portion of the second container, and such that at least a portion of the second guide member contacts at least a portion of the third container.

* * * * *